(12) United States Patent
Kim

(10) Patent No.: US 11,996,536 B2
(45) Date of Patent: May 28, 2024

(54) MULTILAYERED FIREWALL AND BATTERY PACK COMPRISING THE SAME

(71) Applicant: SK Innovation Co., Ltd., Seoul (KR)

(72) Inventor: Tae Il Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/443,775

(22) Filed: Jul. 27, 2021

(65) Prior Publication Data

US 2022/0037715 A1  Feb. 3, 2022

(30) Foreign Application Priority Data

Jul. 28, 2020 (KR) ........................ 10-2020-0093791

(51) Int. Cl.
*H01M 10/658* (2014.01)
*A62C 3/16* (2006.01)
(Continued)

(52) U.S. Cl.
CPC ............. *H01M 10/658* (2015.04); *A62C 3/16* (2013.01); *H01M 10/613* (2015.04); *H01M 10/647* (2015.04); *H01M 10/655* (2015.04); *H01M 10/6555* (2015.04); *H01M 10/659* (2015.04); *H01M 50/211* (2021.01); *H01M 50/231* (2021.01); *H01M 50/24* (2021.01); *H01M 50/244* (2021.01); *H01M 50/247* (2021.01); *H01M 50/249* (2021.01); *H01M 50/258* (2021.01); *H01M 50/383* (2021.01); *H01M 2200/10* (2013.01); *Y02E 60/10* (2013.01)

(58) Field of Classification Search
None
See application file for complete search history.

(56) References Cited

U.S. PATENT DOCUMENTS

2013/0045401 A1* 2/2013 Yoon ................... H01M 50/543
429/153
2016/0359211 A1* 12/2016 Kenney ............. H01M 10/6557
(Continued)

FOREIGN PATENT DOCUMENTS

| JP | 2018-503233 A | 2/2018 |
| JP | 2018-206605 A | 12/2018 |
| JP | 2019-083150 A | 5/2019 |

OTHER PUBLICATIONS

Machine English translation of JP2018206605A from Espacenet originally published to Shimamoto Dec. 2018 (Year: 2018).*

*Primary Examiner* — Ula C Ruddock
*Assistant Examiner* — Mary Grace Byram
(74) *Attorney, Agent, or Firm* — IP & T GROUP LLP

(57) ABSTRACT

Provided is a battery module including a multilayered firewall capable of controlling a heat transfer phenomenon due to a battery fire. The battery module includes a plurality of secondary battery cells accommodated in a housing member, wherein a secondary battery cell among the plurality of battery cells includes an electrode assembly in which a plurality of negative electrodes and positive electrodes are alternately stacked with a separator interposed therebetween and a pouch case encasing the electrode assembly, wherein a multilayered firewall is interposed between the plurality of secondary battery cells, and the multilayered firewall includes a heat absorption layer and fireproof layers stacked on opposing surfaces of the heat absorption layer.

19 Claims, 7 Drawing Sheets

(51) Int. Cl.

| | |
|---|---|
| *H01M 10/613* | (2014.01) |
| *H01M 10/647* | (2014.01) |
| *H01M 10/655* | (2014.01) |
| *H01M 10/6555* | (2014.01) |
| *H01M 10/659* | (2014.01) |
| *H01M 50/211* | (2021.01) |
| *H01M 50/231* | (2021.01) |
| *H01M 50/24* | (2021.01) |
| *H01M 50/244* | (2021.01) |
| *H01M 50/247* | (2021.01) |
| *H01M 50/249* | (2021.01) |
| *H01M 50/258* | (2021.01) |
| *H01M 50/383* | (2021.01) |

(56) References Cited

U.S. PATENT DOCUMENTS

2021/0159556 A1\* 5/2021 Jeong ................ H01M 10/6557
2022/0258453 A1\* 8/2022 Tullis ...................... B32B 27/20

\* cited by examiner

[Fig. 1]
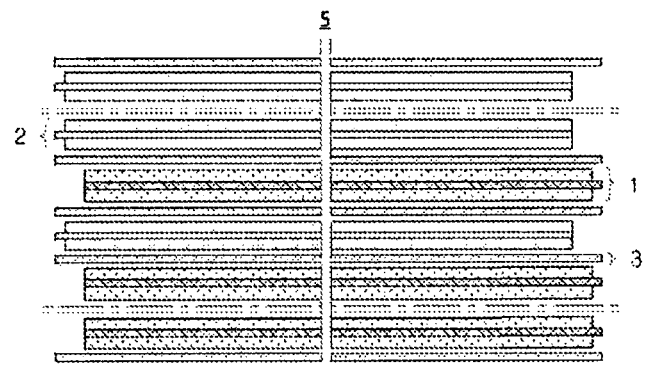
[Fig. 2]
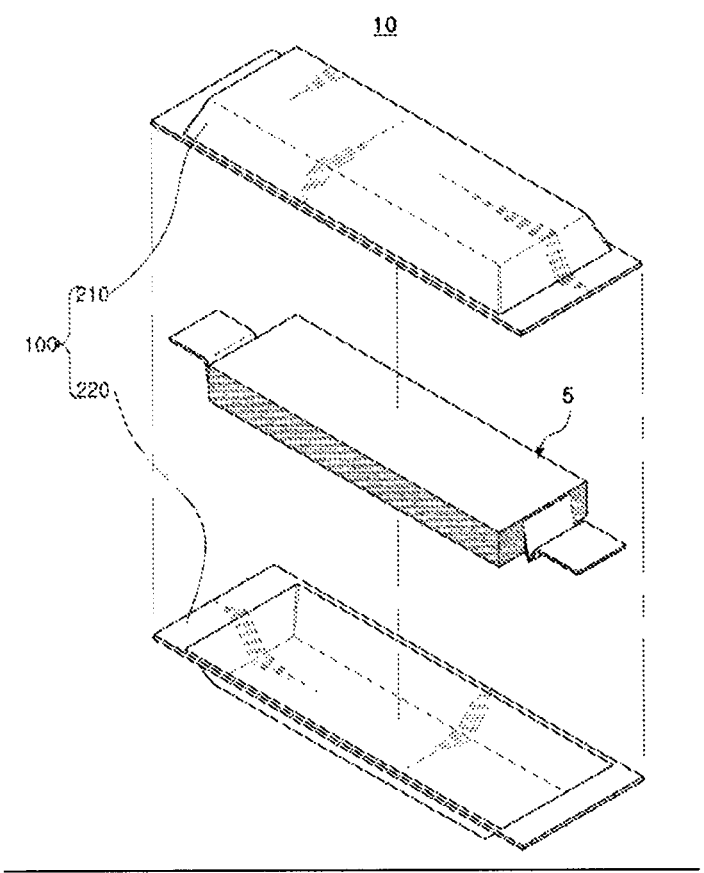

[Fig. 3]
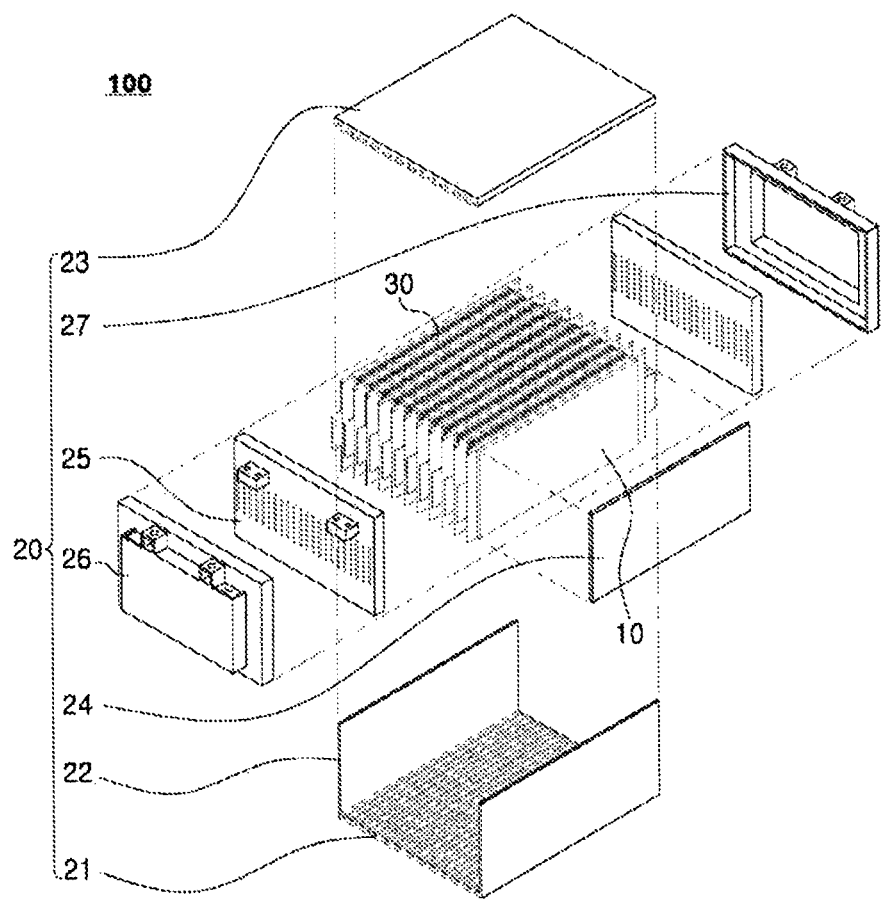

[Fig. 4]
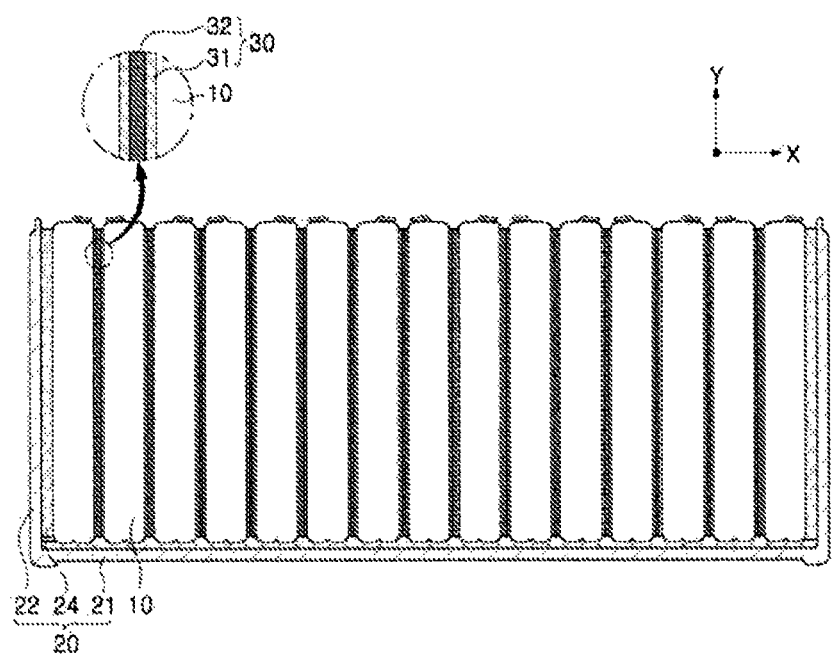

[Fig. 5]
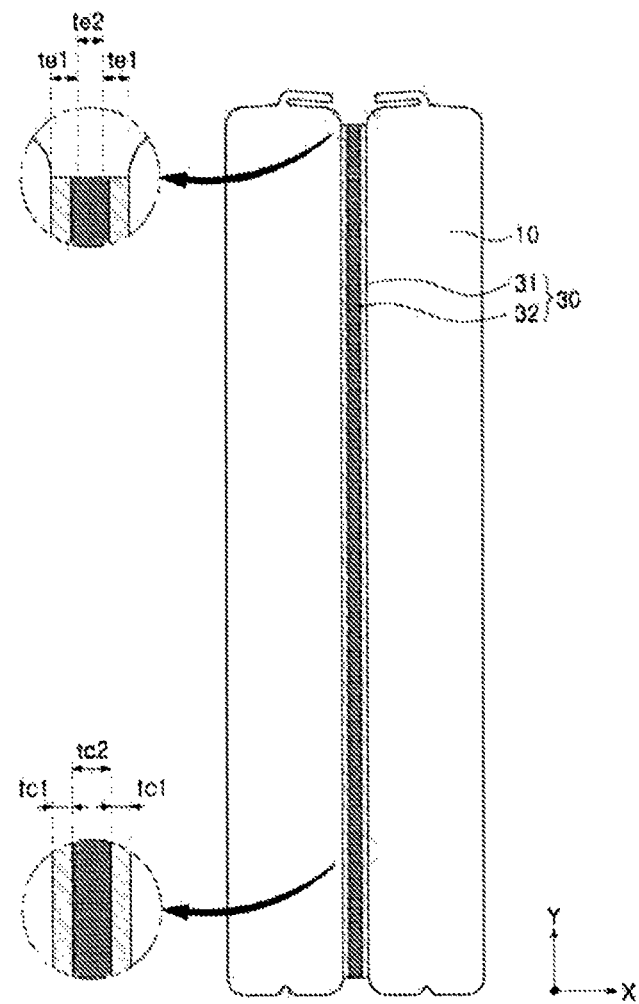

[Fig. 6]
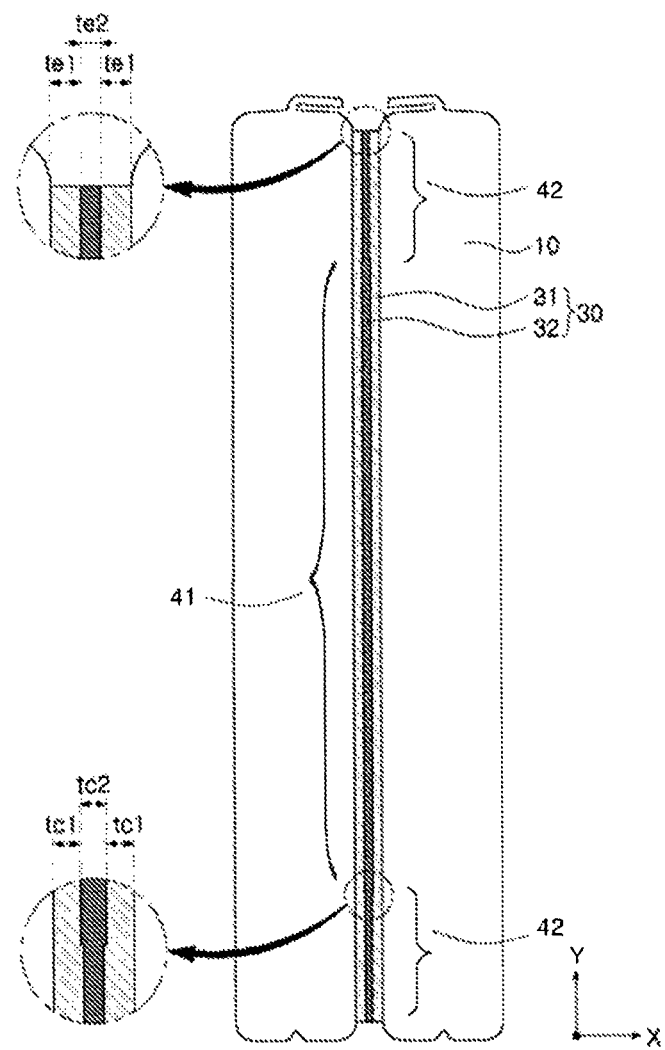

[Fig. 7]
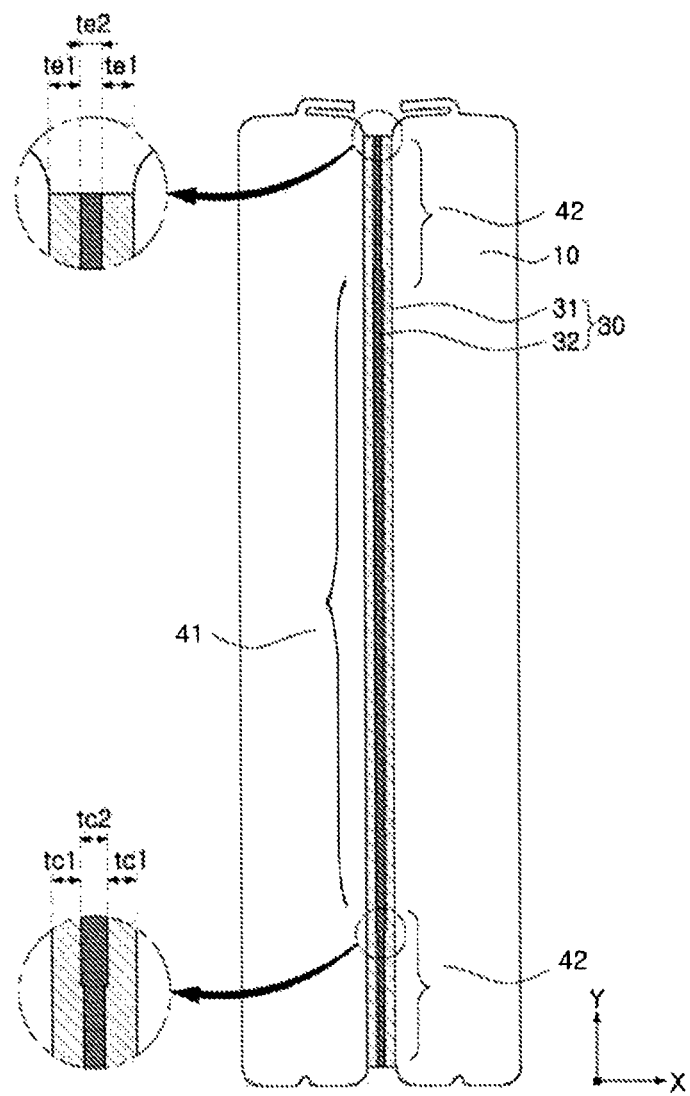

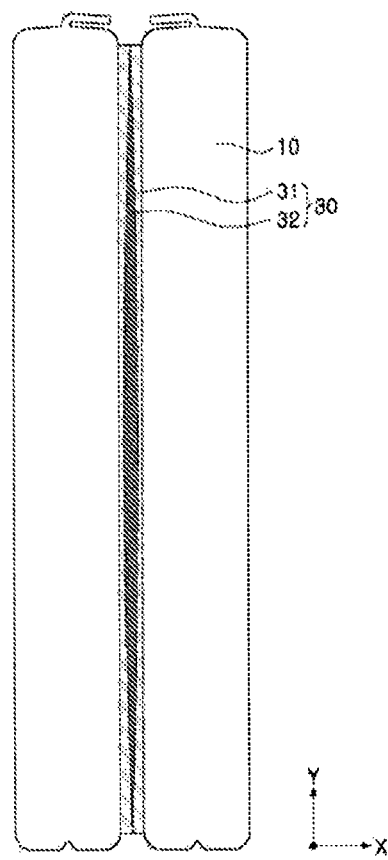
[Fig. 8]

MULTILAYERED FIREWALL AND BATTERY PACK COMPRISING THE SAME

CROSS-REFERENCE TO RELATED APPLICATION(S)

This application claims benefit of priority to Korean Patent Application No. 10-2020-0093791 filed on Jul. 28, 2020 in the Korean Intellectual Property Office, the disclosure of which is incorporated herein by reference in its entirety.

BACKGROUND

1. Field

The present disclosure relates to a battery pack including a multilayered firewall capable of controlling a heat transfer phenomenon due to a battery fire.

2. Description of Related Art

As technologies for mobile devices and electric vehicles have been developed and demand therefor has increased, demand for secondary battery cells as an energy source has rapidly increased. Secondary battery cells in which mutual conversion between chemical energy and electrical energy is reversible are batteries capable of repeating charging and discharging electricity.

Such a secondary battery cell includes an electrode assembly including a positive electrode, a negative electrode, a separator, and an electrolyte, which are major components of the secondary battery, and a cell body member of a laminated film case protecting the electrode assembly.

In addition, a plurality of the secondary battery cells may be installed as a battery module in an electric vehicle or the like.

However, as the electrode assembly undergoes charging and discharging, heat is generated, and an increase in temperature due to the heating may degrade performance of the secondary battery cell and, in addition, any one secondary battery cell may explode due to an internal factor of the battery module such as the increase in temperature of the secondary battery cell or any one secondary battery cell may explode due to an external impact.

Furthermore, the explosion of one secondary battery cell may act high temperature and high pressure on another secondary battery cell adjacent thereto to cause an explosion thereof in a cascading manner.

A technology for a thermal runaway preventing sheet for suppressing heat conduction to adjacent cells in a thermal runaway situation of a secondary battery as described above has been developed. Some related art technologies include technologies for improving heat transmission efficiency by including a cooling member for cooling a cooling battery module in case of heat generation or by providing a cartridge including a thermally conductive additive in a battery module. However, such related art references are directed to cooling heat generated during driving of a cell and do not function in a thermal runaway situation such as cell explosion.

Another related art is disposing a thermal runaway preventing sheet between cells to rapidly absorb heat generated by a cell and block a flame in a thermal runaway situation. The thermal runaway preventing sheet disclosed in the related art has a heat absorbing function in a wide temperature range or exerts a heat absorbing function at a high temperature of 400° C. or higher. Therefore, when a thermal runaway phenomenon occurs, the related art thermal runaway preventing sheet exerts a heat absorbing function as a temperature in a battery or module increases, so that cells may be exposed in the thermal runaway environment for a relatively long time, and thus, a battery function may be damaged by heat transferred to an adjacent cell in a module or even to an adjacent battery module.

Therefore, research into a battery module including a multilayered firewall having a heat absorption function capable of blocking a flame to absorb heat before a specific temperature is reached, preferably, before a predetermined temperature at which an adjacent cell may lose a function of a battery is reached, when a cell, a battery module, or a battery pack is exposed to a thermal runaway environment, is required.

RELATED ART DOCUMENT

Patent Document (Patent document 1) JP 2018-503233 A

SUMMARY

Various embodiments provide a battery module capable of preventing transfer of heat of one secondary battery cell to another secondary battery cell.

Various embodiments provide a battery module solving a problem in which a further secondary battery cell is exploded by a flame due to an explosion of any one secondary battery cell in a cascading manner.

According to an aspect of the present disclosure, a battery module includes a plurality of secondary battery cells accommodated in a housing member, wherein a secondary battery cell among the plurality of battery cells includes an electrode assembly in which a plurality of negative electrodes and positive electrodes are alternately stacked with a separator interposed therebetween and a pouch case encasing the electrode assembly, wherein a multilayered firewall is interposed between the plurality of secondary battery cells, and the multilayered firewall includes a heat absorption layer and fireproof layers stacked on opposing surfaces of the heat absorption layer.

The heat absorption layer may include at least one inorganic powder selected from a group consisting of aluminum hydroxide, talc, calcium carbonate, diatomaceous earth, titanium oxide, vermiculite, zeolite and white carbon (synthetic silica).

The fireproof layer may include at least one flame retardant selected from the group consisting of a bromine-based flame retardant, a chlorine-based flame retardant, a phosphorus-based flame retardant, a boron-based flame retardant, a silicon-based flame retardant, and a nitrogen-based flame retardant.

The multilayered firewall may have a thickness of 0.12 mm to 3 mm, and a thickness of the heat absorption layer may be greater than a thickness of any one fireproof layer.

The heat absorption layer may have a thickness of 0.1 mm to 1 mm, and the fireproof layer may have a thickness of 10 μm to 1 mm.

The multilayered firewall may have a thickness of 0.12 mm to 3 mm, a thickness of a central portion of the heat absorption layer may be greater than a thickness of a central portion of the fireproof layer and may be greater than a thickness of an outer portion of the heat absorption layer.

A thickness of an outer portion of the heat absorption layer may be equal to or less than a thickness of an outer portion of the fireproof layer.

The multilayered firewall may have an endothermic reaction at 110° C. to 150° C., and at least one structural change among phase change, expansion, foaming, and curing may occur by the endothermic reaction.

A weight reduction amount of the multilayered firewall due to the endothermic reaction may be 20% to 40% weight.

The fireproof layers are made of a non-combustible material having a melting point higher than at least 1000° C.

The fireproof layers are each a sheet made of aluminum, iron, stainless steel, tin, lead, a tin-lead alloy, copper, or an alloy any combination thereof.

The fireproof layers are each a sheet made of inorganic fibers including glass fibers, rockwool fibers, ceramic wool fibers, gypsum fibers, carbon fibers, stainless steel fibers, slag fibers, alumina fibers, silica fibers, silica alumina fibers, zirconia fibers and any combination thereof.

The inorganic fiber sheet is laminated on a metal foil.

The bromine-based flame retardant generates a bromine-based gas to block oxygen to thereby inhibit combustion, and includes at least one of tetrabromo bisphenol A, decabromo biphenyl, and pentabromo diphenyl ether.

The chlorine-based flame retardant inhibits combustion by generating a chlorine-based gas to block oxygen, and includes chlorine-based paraffin and chlorine-based polyethylene.

The phosphorus-based flame retardant blocks oxygen and heat by generating a carbonized layer on a surface of or inside the fireproof layers, and includes phosphate esters, and ammonium polyphosphates.

The boron-based flame retardant blocks oxygen and heat by generating a carbonized layer on the surface of or inside the fireproof layers, and includes sodium polyborate, sodium borate, and zinc borate.

The silicone-based flame retardant forms a Si—C inorganic heat insulating layer on the surface of or inside the fireproof layers, and includes a silicone resin.

The nitrogen-based flame retardant blocks oxygen by a nitrogen-based gas, and includes ammonium phosphate, a guanidine compound, and a melamine compound.

According to an aspect of the present disclosure, a battery module comprising: a plurality of secondary battery cells stacked adjacent to each other inside a housing member, and a plurality of multilayered firewalls, each firewall being interposed between a corresponding pair of adjacent secondary battery cells, wherein the multilayered firewall includes fireproof layers and a heat absorption layer disposed between two fireproof layers.

BRIEF DESCRIPTION OF DRAWINGS

The above and other aspects, features, and advantages of the present disclosure will be more clearly understood from the following detailed description, taken in conjunction with the accompanying drawings, in which:

FIG. 1 is a front view of an electrode assembly in which a plurality of negative electrodes and positive electrodes are alternately stacked with a separator interposed therebetween;

FIG. 2 is an exploded perspective view of a battery cell in which the electrode assembly is inserted into a case of the present disclosure;

FIG. 3 is an exploded perspective view of a battery module of the present disclosure;

FIG. 4 is a front view of a battery module of the present disclosure;

FIG. 5 is a front view illustrating an example in which a multilayered firewall including a fireproof layer and a heat absorption layer having a constant thickness is installed between two adjacent secondary battery cells;

FIG. 6 is a front view illustrating an example in which a multilayered firewall including a fireproof layer and a heat absorption layer of which thicknesses are adjusted is installed between two adjacent secondary battery cells;

FIG. 7 is a front view illustrating another example in which a multilayered firewall including a fireproof layer and a heat absorption layer of which thicknesses are adjusted is installed between two adjacent secondary battery cells; and FIG. 8 is a front view illustrating another example in which a multilayered firewall in which thicknesses of a fireproof layer and a heat absorption layer gradually changes from the center to the outer side is installed between two adjacent secondary battery cells.

DETAILED DESCRIPTION

Hereinafter, various embodiments of the present disclosure will be described with reference to the accompanying drawings. However, embodiments of the present disclosure may be modified in various other forms, and the scope of the present disclosure is not limited to the embodiments described below. In addition, embodiments of the present disclosure are provided to more fully explain the present disclosure to those with average knowledge in the art. In the drawings, the shapes and sizes of elements may be exaggerated for clearer explanation.

The articles "a," "an," and "the" are intended to include the plural forms as well, unless the context clearly indicates otherwise, and like or similar reference numerals denote the same elements or corresponding elements throughout the specification.

The present disclosure relates to a battery module, and in the battery module as shown in FIGS. 3 and 4, a plurality of secondary battery cells 10 are accommodated in a housing member 20.

As shown in FIG. 1, the secondary battery cell 10 includes an electrode assembly 5 in which a negative electrode 1 and a positive electrode 2 are alternately stacked, and a separator 3 is inserted therebetween as a boundary. And as shown in FIG. 2, the electrode assembly 5 is inserted into a case 100 and the case 100 is filled with an electrolyte.

The electrolyte may include lithium salts such as $LiPF_6$ or $LiBF_4$ in an organic solvent such as ethylene carbonate (EC), propylene carbonate (PC), diethyl carbonate (DEC), ethyl methyl carbonate (EMC), dimethyl carbonate (DMC), etc. Furthermore, the electrolyte may be a liquid, a solid, or a gel.

In the present disclosure, the case 100 protects the electrode assembly 5 and accommodates the electrolyte, and is a pouch-type case 100. The pouch-type case 100 consisting of an upper case 210 and a lower case 220 seals the electrode assembly from three sides or four sides to accommodate the electrode assembly 5 and the electrolyte.

The present disclosure is to prevent a flame and transfer of heat due to the frame to adjacent cells when the flame occurs due to an explosion or the like in any one of the plurality of secondary battery cells 10 included in the battery module. In general, in the case of a can-type battery, even if a flame occurs due to an explosion of a cell or the like, such a flame is not exposed to the outside of the can, and thus the problem such as in the present disclosure does not arise. However, in the pouch-type secondary battery cell 10 using the pouch-type case, if an explosion occurs inside the cell, the pouch-type case is destroyed and a flame is exposed to the outside of the pouch, and as a result, the flame and heat may be easily transferred to adjacent cells. Therefore, the present disclosure may be effectively applied to the pouch-type secondary battery cell 10.

A plurality of pouch-type secondary battery cells 10 are accommodated in the housing member 20 to constitute a battery module. The housing member 20 serves as a body of the battery module in which the plurality of secondary battery cells 10 are accommodated.

In addition, the housing member 20, a member in which a plurality of secondary battery cells 10 are accommodated, protects the secondary battery cell 10 and transfers electrical energy generated by the secondary battery cell 10 externally transfers electrical energy from the outside to the secondary battery cell 10.

To this end, as shown in FIG. 3, for example, the housing member 20 may include a bottom member 21 and a sidewall member 22, and the like but is not limited thereto.

The bottom member 21 allows the plurality of secondary battery cells 10 to be seated thereon and supports the plurality of secondary battery cells 10 seated thereon. Furthermore, the bottom member 21 may be configured to transfer heat generated by the secondary battery cell 10 to an external heat sink, thus performing cooling.

In addition, the sidewall member 22 forms a side portion of the housing member 20 and may discharge heat generated by the secondary battery cell 10 externally.

The housing member 20 may further include a cover member 23 provided at an upper end of the sidewall member 22 to protect an upper end of the secondary battery. In addition, the housing member 20 may include a front member 26 and a rear member 27 adjacent to the sidewall member 22, and accordingly, the housing member 20 may be configured to encase the plurality of secondary battery cells 10.

Further, the housing member 20 may have an additional component such as a bus bar member 25 electrically connecting the secondary battery cell to the outside.

In addition, a compression member 24 may be provided on an inner surface of the sidewall member 22 to more firmly protect the secondary battery 10.

Heat generated by any one of the plurality of secondary battery cells 10 accommodated in the module may be transferred to another adjacent secondary battery cell 10. In addition, when any one secondary battery cell 10 is exploded, a flame thereof may cause another secondary battery cell 10 adjacent thereto to explode in a cascading manner.

In order to suppress or prevent this problem, in the present disclosure, as shown in FIG. 4, a multilayered firewall 30 is provided between any one secondary battery cell 10, among the plurality of secondary battery cells 10 accommodated in the battery module, and a secondary battery cell 10 adjacent thereto.

The multilayered firewall 30 blocks a flame so that the heat and/or flame generated by any one secondary battery cell 10 does not propagate to an adjacent secondary battery cell 10 and absorbs generated heat to serve to block transfer of heat to the adjacent secondary battery cell. Accordingly, heat transfer or explosion propagation from any one of the secondary battery cells 10 may be prevented.

Thus, the multilayered firewall 30 according to the present disclosure includes a heat absorption layer 32. The heat absorption layer 32 may absorb heat generated due to an explosion of the secondary battery cell 10 to prevent or delay the occurrence of heat transfer to the adjacent secondary battery cell 10.

The heat absorption layer 32 includes at least one inorganic powder selected from the group consisting of aluminum hydroxide, talc, calcium carbonate, diatomaceous earth, titanium oxide, vermiculite, zeolite, and white carbon (synthetic silica). The inorganic powder performs a function of absorbing heat by a dehydration reaction and forms an inorganic heat insulating layer.

In particular, when a flame is generated due to an explosion or the like of any one secondary battery cell 10 accommodated in the battery module, the flame and heat rapidly propagate to the adjacent secondary battery cell 10. Therefore, it is desirable to quickly absorb generated heat.

A particle of the inorganic powder is not particularly limited in shape but may be spherical, granular, fibrous, rod, and flake, and more preferably spherical.

The heat absorption layer 32 includes a binder to form the inorganic powder in a sheet shape. The binder may include, for example, a thermosetting resin, a thermoplastic resin, a thermoplastic elastomer, and rubber.

Further, the heat absorption layer 32 may be subject to a phenomenon such as a phase change of inorganic powder due to absorption of heat, and expansion, foaming, and hardening due to the phase change. During the development of this phenomenon, a collapse of a structure of the heat absorption layer 32 may be suppressed and strength of a residue of the inorganic powder may be increased. In addition, durability against the collapse of the residue due to heat may be imparted.

The thermoplastic resin may include, for example, synthetic resins such as a polypropylene resin, a polyethylene resin, a poly(1-)butene resin, a polyolefin resin such as polypentene resin, a polyester resin such as polyethylene terephthalate, a polystyrene resin, an acrylonitrile-butadiene-styrene (ABS) resin, an ethylene vinyl acetate copolymer (EVA), a polycarbonate resin, a polyphenylene ether resin, a (meth)acrylic resin, a polyamide resin, a polyvinyl chloride resin (PVC), a novolac resin, a polyurethane resin, and polyisobutylene.

The thermosetting resin may include, for example, synthetic resins such as polyurethane, polyisocyanate, a phenol resin, an epoxy resin, a urea resin, a melamine resin, an unsaturated polyester resin, and polyimide.

The thermoplastic elastomer may include, for example, olefin-based elastomer, styrene-based elastomer, ester-based elastomer, amide-based elastomer, vinyl chloride-based elastomer, and combinations thereof.

In addition, the rubber may include, for example, natural rubber, isoprene rubber, butadiene rubber, 1,2-polybutadiene rubber, styrene-butadiene rubber, chloroprene rubber, nitrile rubber, butyl rubber, chlorinated butyl rubber, ethylene-propylene rubber, ethylene-propylene-diene rubber (EPDM), chlorosulfonated polyethylene, acrylic rubber, epichlorohydrin rubber, highly vulcanized rubber, un-vulcanized rubber, silicone rubber, fluorine rubber, urethane rubber, etc.

As the binder, any one of the synthetic resin and/or rubber may be used alone, or two or more types may be used together.

Among these synthetic resins and/or rubber materials, PVC and EVA are preferred in terms of molding processability. In order to obtain flexible and rubbery properties, un-vulcanized rubbers such as butyl rubber and polyolefin resins are preferred. Polyimide and PVC are preferable from the viewpoint of heat resistance. Epoxy resins are preferred from the viewpoint of enhancing flame retardancy of the resin itself and improving fire protection performance.

The heat absorption layer 32 according to the present disclosure starts an endothermic reaction at a temperature of 110° C. or higher, and at least 50% of total endothermic performance, for example, endothermic performance of 50% to 80%, is manifested in a temperature range of 110° C. to 150° C. Specifically, as the heat absorption layer 32 according to the present disclosure absorbs heat, the heat absorption layer 32 is reduced in weigh and has a weight reduction rate of 26% or more in a temperature range up to 150° C. Accordingly, in a thermal runaway situation, the heat absorption layer 32 may rapidly absorb heat to suppress or delay an increase in temperature inside the battery module.

However, if the heat absorption layer 32 is directly exposed to a flame, the inorganic powder, which is a heat absorptive component, included in the heat absorption layer 32 may be oxidized and heat absorbing performance may be significantly deteriorated. Therefore, it is preferable to prevent the heat absorption layer 32 from being directly exposed to a flame, and to this end, the multilayered firewall 30 of the present disclosure includes a fireproof layer 31 blocking flames on both sides of the heat absorption layer 32.

The fireproof layer 31 not only blocks a flame occurring in the adjacent secondary battery cell 10 but also blocks particles and oil mist formed during an explosion from being transferred to the adjacent secondary battery cell 10 to serve to protect the adjacent secondary battery cell 10.

To this end, the fireproof layer 31 of the battery module according to an embodiment of the present disclosure may be formed of a material having fire resistance higher than that of the heat absorption layer 32.

When heat or a flame occurs by heating or an explosion in the adjacent secondary battery cell 10, the fireproof layer 31 forming an external layer of the multilayered firewall 30 is directly exposed to heat or a flame. Thus, in order to prevent the heat absorption layer from being melted or burnt by heat or a flame, the fireproof layer 31 is formed of a material having fire resistance higher than that of the heat absorption layer 32.

As an example, the fireproof layer 31 of the battery module according to an embodiment of the present disclosure may be formed of a material having a melting point higher than at least 1000° C. Accordingly, in a case in which heat generated by heating or an explosion in the adjacent secondary battery cell 10 is formed below 1000° C., the fireproof layer 31 does not melt, and further, the heat absorption layer 32 is not directly exposed to the flame. Thus, the multilayered firewall 30 may secure durability.

For example, the fireproof layer 31 may be formed of a non-combustible base material, and examples of the non-combustible base material include a metal base material and an inorganic base material. Among these, as the metal base material, for example, a sheet made of aluminum, iron, stainless steel, tin, lead, a tin-lead alloy, copper, or an alloy of two or more thereof may be used.

In addition, the inorganic base material may be a sheet-like material formed of inorganic fibers using glass fiber, rockwool, ceramic wool, gypsum fiber, carbon fiber, stainless steel fiber, slag fiber, alumina fiber, silica fiber, silica alumina fiber, zirconia fiber, etc. Moreover, the inorganic fiber used in an inorganic fiber layer may also be laminated on a metal foil.

The fireproof layer 31 may include a flame retardant. The flame retardant may include at least one kind of flame retardant selected from the group consisting of bromine-based flame retardants, chlorine-based flame retardants, phosphorus-based flame retardants, boron-based flame retardants, silicon-based flame retardants, and nitrogen-based flame retardant. The flame retardant may be used alone or in a combination of two or more types.

The bromine-based flame retardant generates a bromine-based gas to block oxygen, thereby inhibiting combustion, and may include tetrabromo bisphenol A, decabromo biphenyl, pentabromo diphenyl ether, and the like.

The chlorine-based flame retardant inhibits combustion by generating a chlorine-based gas to block oxygen, and examples thereof include chlorine-based paraffin and chlorine-based polyethylene.

The phosphorus-based flame retardant blocks oxygen and heat by generating a carbonized layer on a surface of or inside the fireproof layer, and may include phosphate esters, ammonium polyphosphates, and the like.

The boron-based flame retardant also blocks oxygen and heat by generating a carbonized layer on the surface of or inside the fireproof layer, and examples thereof include sodium polyborate, sodium borate, and zinc borate.

The silicone-based flame retardant is to form a Si—C inorganic heat insulating layer on the surface of or inside the fireproof layer, and may include a silicone resin or the like.

The nitrogen-based flame retardant blocks oxygen by a nitrogen-based gas, and includes ammonium phosphate, a guanidine compound, a melamine compound, and the like.

As described above, the multilayered firewall 30 according to the present disclosure has a multilayer structure in which the fireproof layers 31 are stacked on both sides of the heat absorption layer 32. When ignition occurs in any one secondary battery cell 10 accommodated in the battery module, the fireproof layer 31 blocks a transfer of a flame and the heat absorption layer 32 absorbs heat based on the frame, thereby preventing or delaying heat transfer to the adjacent secondary battery cell 10, and thus, since heat transfer to another battery module is blocked, the other secondary battery cell 10 or another battery module may be prevented from losing a function thereof due to heat, thus preventing loss of an overall function of the battery.

The fireproof layer 31 may further include a thermally expandable material, if necessary. The thermally expandable material may be used to form a heat-insulating layer to provide an effect of closing a space serving as a flow path of a flame or heat, thereby inhibiting or reducing transfer of a flame or excessive heat to the heat absorption layer 32.

The thermally expandable material may include a thermally expandable microcapsule, a microcapsule containing water, a foaming agent, a microencapsulated foaming agent, a thermally expandable layered inorganic material, and the like, and may include a combination of two or more thereof.

The thermally expandable microcapsule contains a volatile expanding agent that becomes gaseous at a temperature below a softening point of a plastic polymer in a shell formed of the polymer obtained by polymerizing a composition including one or more types of monomers and a crosslinking agent. For example, the shell may be an expandable microcapsule including a polymer formed by polymerizing a monomer mixture containing 95 wt % or more of (meth)acrylonitrile of which 70 wt % or more is acrylonitrile, and having a 60 wt % of more of crosslink density, which may be referred to International application publication No. 2010/052972. When the polymer contains a monomer other than (meth)acrylonitrile, examples of such monomers include monomers selected from the group consisting of methacrylic acid esters, acrylic acid esters, styrene, vinylidene chloride and vinyl acetate.

Examples of the volatile expanding agent may include a low boiling point organic solvent or a compound which is pyrolyzed by heating to form a gaseous state. Among them, a low boiling point organic solvent is particularly suitably used. These volatile expanding agents may be used alone or in a combination of two or more thereof.

The low boiling point organic solvent may include hydrocarbons such as, for example, ethane, ethylene, propane, propene, n-butane, isobutane, n-butene, isobutene, n-pentane, isopentane, neopentane, n-hexane, heptanes, nonane, decane, and petroleum ether; chlorofluorocarbons such as $CCl_3F$, $CCl_2F_2$, $CClF_3$, $CClF_2$—$CCl_2F_2$; tetraalkylsilanes such as tetramethylsilane, trimethylethylsilane, trimethylisopropylsilane, and trimethyl-n-propylsilane, and the like. Among them, hydrocarbons such as n-butane, isobutane, n-pentane, isopentane, n-hexane, nonane, decane, and petroleum ether may be used, Preferably, hydrocarbons having 3 to 12 carbon atoms may be used. In addition, linear hydrocarbons and esters may also be used. Particularly preferably, a hydrocarbon having 4 or more carbon atoms may be used. These low boiling point organic solvents may be used alone or in a combination of two or more thereof.

The microcapsule including water is a microcapsule containing water.

Examples of the foaming agent include inorganic foaming agents, organic foaming agents, and combinations thereof. Examples of the inorganic foaming agent include gas generating agents which are inorganic compounds such as water and sodium bicarbonate. These inorganic foaming agents may be used alone or in a combination of two or more thereof.

Examples of the organic foaming agent include hydrocarbons such as ethane, ethylene, propane, propene, n-butane, isobutane, n-butene, isobutene, n-pentane, isopentane, neopentane, n-hexane, heptane, nonane, decane, and petroleum ether; azo compound-containing foaming agents such as azodicarbonamide (ADCA) and azodiaminobenzene; nitroso compound-containing foaming agents such as dinitrosopentamethylenetetramine (DPT) and N,N'-dinitroso-N,N'-dimethyl terephthalamide; and sulfonyl hydrazide-containing foaming agents such as benzenesulfonyl hydrazide, p,p'-oxybisbenzenesulfonyl hydrazide (OBSH), and hydrazodicarbonamide (HDCA). These organic foaming agents may be used alone or in a combination of two or more thereof.

Micro-encapsulated foaming agents are one or two or more foaming agents encapsulated in a microcapsule. As a synthetic resin used for microcapsules, for example, a thermoplastic synthetic resin having a viscosity that melts at a certain temperature or higher and expands to a substantially spherical shape without breaking the microcapsules may be used.

As an embodiment of the present disclosure, as shown in FIG. 5, the multilayered firewall 30 may have a multilayer structure in which the heat absorption layer 32 is thick, the fireproof layer 31 is thin, and an overall thickness is constant.

For example, a total thickness of the multilayered firewall 30 having the structure of the fireproof layer 31/heat absorption layer 32/fireproof layer 31 may have a thickness of 0.12 mm to 3 mm or less, and the fireproof layer 31 and the heat absorption layer 32 may have a constant thickness. For example, in the present embodiment, the heat absorption layer 32 constituting the multilayered firewall 30 may have a thickness of 0.1 mm to 1 mm and may have a thickness of 0.1 mm to 0.8 mm, 0.3 mm to 0.8 mm, and 0.3 mm to 0.5 mm. If the thickness is less than 0.1 mm, the heat absorption layer 32 may be too thin to exhibit rapid heat absorption in a thermal runaway environment, and if the thickness exceeds 1 mm, a thickness of the battery module increases, resulting in a decrease in battery capacity, which is not preferable.

Meanwhile, the fireproof layer 31 constituting the multilayered firewall 30 may have a thickness of 10 μm to 1 mm, and may have a thickness of for example, 10 μm, 30 μm, 50 μm, 100 μm or 300 μm or more and 1 mm, 0.7 mm, or 0.5 mm or less.

In the multilayered firewall 30 as another embodiment of the present disclosure, in the heat absorption layer 32, a thickness of a central portion in contact with a main chamber of the secondary cell 10, i.e., a region in which a composite layer of the secondary battery 10 is formed, may be greater than a thickness of an outer portion, i.e., a thickness of the edge portion. Specifically, a cross-sectional structure of the multilayered firewall 30 according to the embodiment as described above is schematically shown in FIG. 6 or 7.

As shown in FIG. 6, in the multilayered firewall 30, a thickness tc2 of the heat absorption layer 32 is greater than a thickness tc1 of the fireproof layer 31 in a central portion 41 of the region in contact with the main chamber of the secondary battery cell 10, and in an outer portion 42 of the region in contact with the secondary battery cell 10, a thickness te1 of the fireproof layer 31 and a thickness te2 of the heat absorption layer 32 may be equal. Accordingly, the thicknesses of the heat absorption layer 32 may be different in the central portion 41 and in the outer portion 42, and the thickness of the heat absorption layer 32 in the central portion 41 may be greater.

In this manner, by forming the heat absorption layer 32 thicker in the region facing the central portion 41 in which a relatively large amount of heat is generated in the secondary battery cell 10, a heat absorbing effect in the central portion 41 may be concentrated.

In addition, as shown in FIG. 7, in a central portion 41 of the multilayered firewall 30 in contact with a main chamber of the secondary battery cell 10, the fireproof layer 31 may be thinner than the heat absorption layer 32. Meanwhile, in an outer portion 42 of a region in contact with the secondary battery cell 10, a thickness te1 of the firewall layer 31 may be greater than a thickness te2 of the heat absorption layer 32. Here, in the region in contact with the main chamber of the secondary battery cell, the thickness of the heat absorption layer and the thickness of the firewall layer may have the same thickness range, and a description thereof will be omitted.

A region in which a flame occurs by an explosion of the secondary battery cell 10 is mainly an outer portion 42 of the secondary battery cell 10. Thus, by forming the thickness of the firewall layer 31 to be greater than that of the central portion 41 in the region facing an outer portion 42 of the secondary battery cell 10 having a high incidence rate, the outer portion 42 may be more robust against the flame. Thus, by blocking the frame occurring in the outer portion 42, heat absorption layer 32 may be prevented from directly contacting the flame, thereby maintaining performance of the heat absorption layer 32.

Here, in the embodiment shown in FIGS. 6 and 7, a total thickness of the multilayered firewall may be formed in a thickness range according to the embodiment shown in FIG. 5.

In another embodiment of the present disclosure, as shown in FIG. 8, the multilayered firewall 30 may be designed to include the firewall layer 31 having a thickness gradually decreasing from a central portion toward an outer portion. That is, as shown in FIG. 8, the multilayered firewall 30 according to an embodiment of the present disclosure may be configured such that a thickness of the fireproof layer 31 gradually decreases from an outer portion of a region in contact with the main chamber of the secondary battery cell 10 toward the central portion, while a thickness of the heat absorption layer 32 gradually increases toward the central portion. Here, the thickness of the fireproof layer 31 and the heat absorption layer 32 may be continuously changed as shown in FIG. 7, and alternatively, although not shown, the thickness of the fireproof layer 31 and the heat absorption layer 32 may be changed stepwise like a step.

That is, while a thickness tc2 of the heat absorption layer 32 is greater than a than a thickness tc1 of the firewall layer 31 in the central portion of the multilayered firewall 30 in a region in contact with the secondary battery cell 10, the thickness of the heat absorption layer 32 may decrease toward the outer portion of the region in contact with the secondary battery cell 10. In this case, the thickness te1 of the firewall layer 31 may be greater than the thickness te2 of the heat absorption layer 32 in the outer portion of the multilayered firewall 30.

In addition, by gradually changing the thickness adjustment ratio as described above, a heat transfer prevention effect may be gradually increased toward the center of the secondary battery cell 10 in which a relative large amount of heat is generated. In addition, the outer portion of the secondary battery cell 10 in which a flame occurs more frequently may be formed to be more firm, thereby preventing loss due to the frame.

In this case, a total thickness of the multilayered firewall in the embodiment shown in FIG. 7 may be formed in a thickness range according to the embodiment shown in FIG. 4.

As described above, the battery module of the present disclosure includes the multilayered firewall 30 between the plurality of secondary battery cells 10 so that propagation of at least one of heat and a flame occurring in any one secondary battery cell 10 to another secondary battery cells 10 adjacent thereto.

According to the present disclosure, by including a multilayered firewall between secondary battery cells, heat transfer from one secondary battery cell to another secondary battery cell in the battery pack structure when a fire occurs may be delayed or prevented.

More specifically, in the case of a thermal runaway phenomenon due to ignition in a partial secondary battery cell in a battery module, heat is absorbed at a low temperature at an initial stage of the thermal runaway phenomenon, thereby preventing a degradation of performance of an adjacent cell, further the battery module.

While example exemplary embodiments have been shown and described above, it will be apparent to those skilled in the art that modifications and variations could be made without departing from the scope of the present disclosure as defined by the appended claims.

What is claimed is:

1. A battery module including a plurality of secondary battery cells accommodated in a housing member,
   wherein a secondary battery cell among the plurality of battery cells includes an electrode assembly and a pouch case encasing the electrode assembly,
   wherein a multilayered firewall is interposed between the plurality of secondary battery cells, and the multilayered firewall includes a heat absorption layer and fireproof layers stacked on opposing surfaces of the heat absorption layer,
   wherein a thickness of a central portion of the heat absorption layer is greater than a thickness of a central portion of the fireproof layers, wherein the central portion of the fireproof layers is a region in thermal contact with a region in which a composite layer of the secondary battery is formed, and
   wherein a thickness of the outer portion of the heat absorption layer is equal to or less than a thickness of an outer portion of the fireproof layers and is less than the thickness of the central portion of the heat absorption layer, wherein the outer portion of the fireproof layers is a region in thermal contact with a peripheral of the plurality secondary battery cells.

2. The battery module of claim 1, wherein the heat absorption layer includes at least one inorganic powder selected from a group consisting of aluminum hydroxide, talc, calcium carbonate, diatomaceous earth, titanium oxide, vermiculite, zeolite and white carbon.

3. The battery module of claim 1, wherein the fireproof layer includes at least one flame retardant selected from a group consisting of a bromine-based flame retardant, a chlorine-based flame retardant, a phosphorus-based flame retardant, a boron-based flame retardant, a silicon-based flame retardant, and a nitrogen-based flame retardant.

4. The battery module of claim 1, wherein the multilayered firewall has a thickness of 0.12 mm to 3 mm, and a thickness of the heat absorption layer is greater than a thickness of any one fireproof layer.

5. The battery module of claim 4, wherein the heat absorption layer has a thickness of 0.1 mm to 1 mm, and the fireproof layer has a thickness of 10 μm to 1 mm.

6. The battery module of claim 1, wherein the multilayered firewall has a thickness of 0.12 mm to 3 mm, a thickness of a central portion of the heat absorption layer is greater than a thickness of an outer portion of the heat absorption layer.

7. The battery module of claim 1, wherein the multilayered firewall has an endothermic reaction at 110° C. to 150° C., and at least one structural change selected from a group consisting of phase change, expansion, foaming, and curing occurs by the endothermic reaction.

8. The battery module of claim 7, wherein a weight reduction amount of the multilayered firewall due to the endothermic reaction is 20% to 40%.

9. The battery module of claim 1, wherein the fireproof layers are made of a non-combustible material having a melting point higher than at least 1000° C.

10. The battery module of claim 1, wherein the fireproof layers are each a sheet made of at least one selected from a group consisting of aluminum, iron, stainless steel, tin, lead, a tin-lead alloy, copper, and any combination thereof.

11. The battery module of claim 1, wherein the fireproof layers are each a sheet made of inorganic fibers including at least one selected from a group consisting of glass fibers, rockwool fibers, ceramic wool fibers, gypsum fibers, carbon fibers, stainless steel fibers, slag fibers, alumina fibers, silica fibers, silica alumina fibers and zirconia fibers.

12. The battery module of claim 11, wherein the inorganic fiber sheet is laminated on a metal foil.

13. The battery module of claim 3, wherein the bromine-based flame retardant generates a bromine-based gas to block oxygen to thereby inhibit combustion, and includes at least one selected from a group consisting of tetrabromo bisphenol A, decabromo biphenyl, and pentabromo diphenyl ether.

14. The battery module of claim 3, wherein the chlorine-based flame retardant inhibits combustion by generating a chlorine-based gas to block oxygen, and includes chlorine-based paraffin and chlorine-based polyethylene.

15. The battery module of claim 3, wherein the phosphorus-based flame retardant blocks oxygen and heat by generating a carbonized layer on a surface of or inside the fireproof layers, and includes phosphate esters, and ammonium polyphosphates.

16. The battery module of claim 3, wherein the boron-based flame retardant blocks oxygen and heat by generating a carbonized layer on the surface of or inside the fireproof layers, and includes sodium polyborate, sodium borate, and zinc borate.

17. The battery module of claim 3, wherein the silicone-based flame retardant forms a Si—C inorganic heat insulating layer on the surface of or inside the fireproof layers, and includes a silicone resin.

18. The battery module of claim 3, wherein the nitrogen-containing compound blocks oxygen by a nitrogen-based gas, and includes ammonium phosphate, a guanidine compound, and a melamine compound.

19. A battery module comprising:
a plurality of secondary battery cells stacked adjacent to each other inside a housing member, and
a plurality of multilayered firewalls, each firewall being interposed between a corresponding pair of adjacent secondary battery cells,
wherein the multilayered firewall includes fireproof layers and a heat absorption layer disposed between two fireproof layers,
wherein a thickness of a central portion of the heat absorption layer is greater than a thickness of a central portion of the fireproof layers, wherein the central portion of the fireproof layers is a region in thermal contact with a region in which a composite layer of the secondary battery is formed, and
wherein a thickness of the outer portion of the heat absorption layer is equal to or less than a thickness of an outer portion of the fireproof layers and is less than the thickness of the central portion of the heat absorption layer, wherein the outer portion of the fireproof layers is a region in thermal contact with a peripheral of the plurality secondary battery cells.

* * * * *